J. KOHLER.
SPRING WHEEL.
APPLICATION FILED AUG. 28, 1911.

1,040,694.

Patented Oct. 8, 1912.

2 SHEETS—SHEET 1.

Attest:
Chas. H. Buell.
Henry Weir.

Inventor:
Joseph Kohler,
By Robert Burns,
Atty.

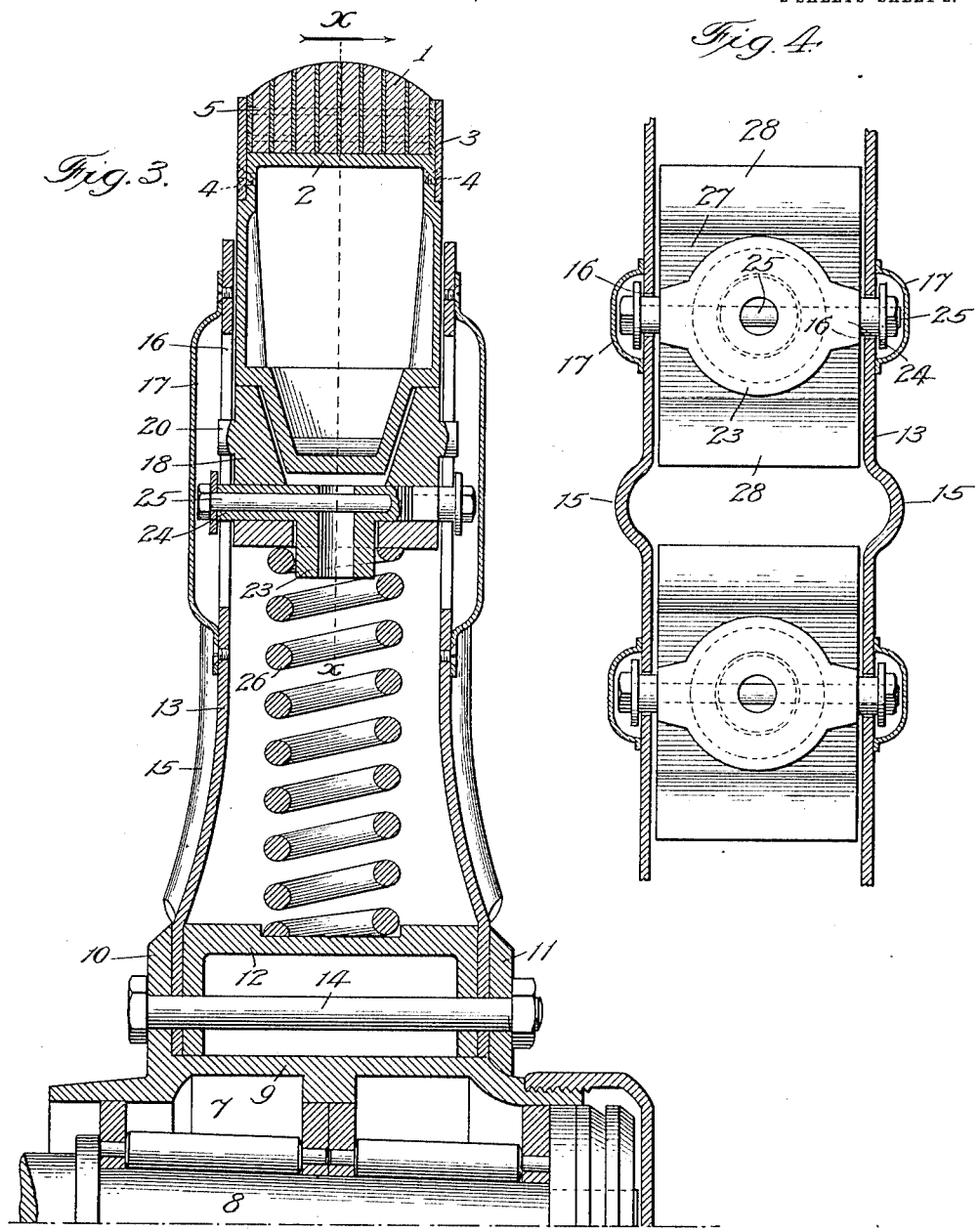

UNITED STATES PATENT OFFICE.

JOSEPH KOHLER, OF CHICAGO, ILLINOIS, ASSIGNOR OF ONE-HALF TO KITTIE COLLINS, OF CHICAGO, ILLINOIS.

SPRING-WHEEL.

1,040,694.  Specification of Letters Patent.  Patented Oct. 8, 1912.

Application filed August 28, 1911. Serial No. 646,500.

*To all whom it may concern:*

Be it known that I, JOSEPH KOHLER, a citizen of the United States of America, and a resident of Chicago, in the county of Cook, State of Illinois, have invented certain new and useful Improvements in Spring-Wheels, of which the following is a specification.

This invention relates to that class of vehicle wheels in which the rim is resiliently connected to the hub by a series of coiled springs, and has for its object to provide a simple and efficient structural formation and combination of parts, wherein a strong and durable yielding connection is attained between the hub and rim, so that when the wheel is used as a driver, the traction or pull is transmitted from the hub to the rim in a very effective manner and with a minimum amount of friction and wear between the parts, all as will hereinafter more fully appear.

Figure 1:
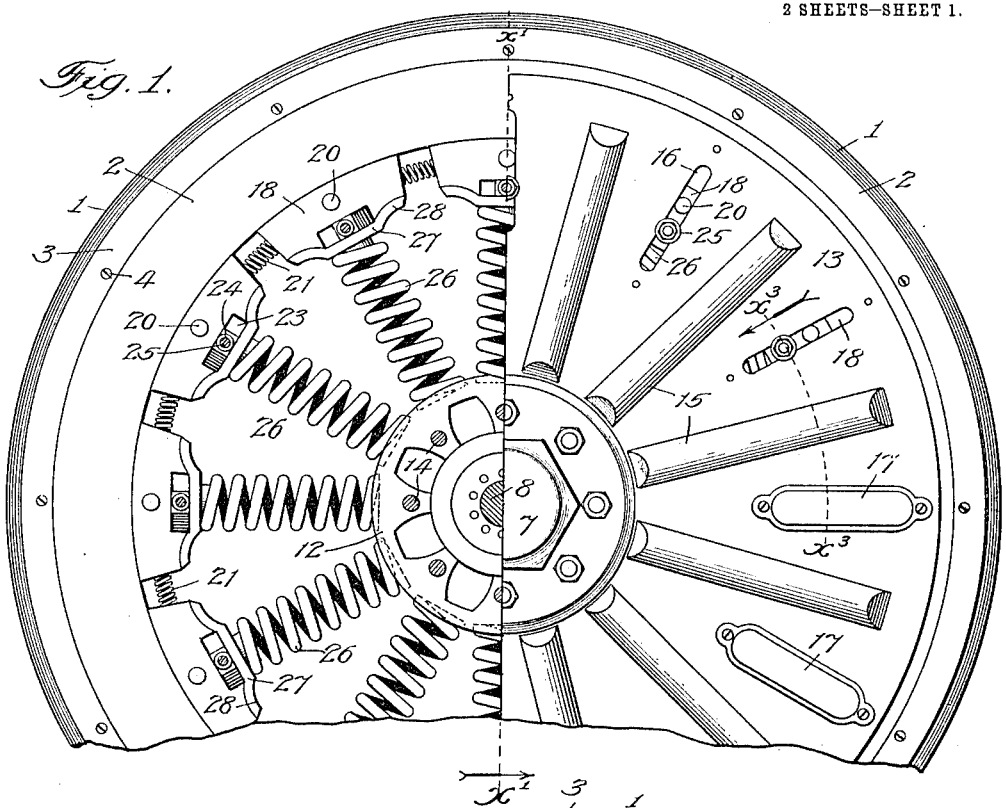
Figure 2:
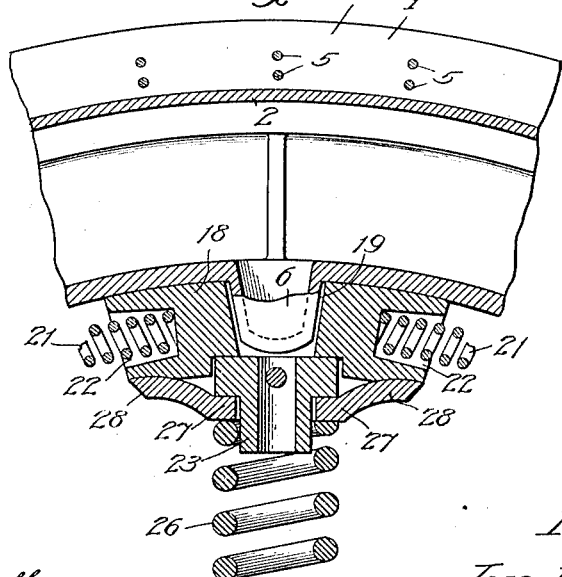

In the accompanying drawings: Figure 1, is a side elevation of a spring wheel embodying the present invention, parts of side plates and other accessories being broken away and shown in section to illustrate the detail construction of the parts. Fig. 2, is an enlarged detail longitudinal section on line $x$—$x$, Fig. 3. Fig. 3, is an enlarged detail transverse section on line $x'$—$x'$, Fig. 1. Fig. 4, is an enlarged detail cross section on line $x^3$—$x^3$, Fig. 1.

Similar reference numerals indicate like parts in the several views.

Referring to the drawings, 1 represents the semi-elastic tire of the wheel of any usual material and construction and preferably formed with a rounded crown or tread, flat parallel sides and a flat inner surface, as shown, and adapting the tire to fit the annular receiving channel of the rim portion of the wheel now to be described.

2 is the rim portion of the wheel above referred to, and which is of an annular rectangular box form and provided near its outer edges with annular shoulders to receive the annular side plates 3, by which the tire 1 is held in place.

4 are a circular series of screws for connecting the side plates 3 to the rim portion 2, while 5, are circular series of transverse bolts by which the side plates 3 are clamped upon the sides of the tire 1.

6 are circular series of radial truncated cone-shaped projections which extend inwardly from the inner circular wall of the rim portion 2, aforesaid, and adapted for engagement with a series of saddle pieces hereinafter described.

7 is the wheel hub of the usual tubular form adapting it for attachment to the axle 8, upon which said hub is mounted in any usual and suitable manner. In the present construction said hub 7 is formed with a main central cylindrical portion 9 and with an out-turned flange 10 at one end of the portion 9 as shown more particularly in Fig. 3.

11 is an annular disk, a counterpart of the flange 10, and fitting the other end of the aforesaid cylindrical portion 9 of the hub 2.

12 is an annular filler piece, of a channel form in cross-section, and which is adapted to encircle the aforesaid central hub portion 9, and separate the side plates hereinafter described.

13 are substantially counterpart side plates which are secured between the before described flange 10, annular disk 11 and filler piece 12 by the circular series of transverse bolts 14, to provide a strong and substantial connection between said side plates and the hub portion of the wheel. The side plates 13, are formed with a disk as shown, so as to be separated a greater distance at their point of attachment to the hub 2, than at their periphery and with a view to insure greater lateral stability, and with a view to further increase said lateral stability, the respective side plates 13 are formed with a series of radial reinforcing corrugations 15, as shown.

16 are a series of radial guide slots formed in the respective side plates 13, and adapted for guiding engagement with the lateral guide studs of the saddle pieces and spring plugs hereinafter described.

17 are elongated cup-shape cover pieces arranged over the guide slots 16 aforesaid, and adapted to inclose or house the guide studs above referred to, and their attaching heads or nuts.

18 are the series of saddle pieces above referred to, and which have bearing against the inner circular wall of the rim portion 2 of the wheel. At their central portions said saddle pieces are formed with conical orifices 19, of a greater size than the cone projections 6 of the rim portion 2 aforesaid, and adapted to fit loosely over said projections and permit of limited independent movement between the parts.

20 are lateral studs on the respective sides of the saddle pieces 18 and adapted for sliding engagement in the radial guide slots 16 of the side plates 13, aforesaid.

21 are a series of coiled springs arranged between adjacent ends of the respective saddle pieces 18, and adapted to normally maintain the saddle pieces in place, with their cone shaped orifices 19 in even relation around the cone projections 6 of the wheel rim 2. Such construction is adapted to permit of a slight movement between the parts when exposed to road strains, with a return of the parts to a normal position with the ending of said strains. The respective ends of the springs 21 fit socket orifices 22 formed therefor in the respective ends of the saddle pieces 18, so that after assemblage, the springs are held in place against any ordinary strain to which the parts may be exposed.

23 are a series of plugs fitting the outer ends of the series of radial springs hereinafter described, and provided with winged heads at their outer ends, which fit recesses formed therefor in the inner faces of the saddle pieces 18, aforesaid. The wings 24 of said heads extend transversely, and engage in the radial guide slots 16 of the side plates 13, aforesaid.

25 are transverse bolts passing through the wings 24, and having bolt heads and nuts as shown, whereby the side plates are held in proper relation to the parts just described.

26 are a series of radial coiled springs, the inner ends of which rest in socket recesses in the filler piece 12 above described, while their outer ends are adapted for engagement with the series of plugs 23, aforesaid, and have bearing against the interposed abutment plates now to be described.

27 are a series of abutment plates against which the outer ends of the coiled springs 26 have abutment as above stated. Said plates are formed with central orifices which fit over the shank portions of the plugs 23, and admit of said shank portions projecting a distance into the bore of the springs 26, as shown. The abutment plates 27 are also formed with curved end wings 28 that have bearing against correspondingly curved seats on the inner faces of the saddle pieces 18, and adapted to transmit and local stress from said saddle pieces 18 to the outer ends of the springs 26, independent of the plugs 23 by which the outer ends of the springs are held in proper relation to their accessory parts.

Having thus fully described my said invention what I claim as new and desire to secure by Letters Patent, is:—

1. The combination in a spring wheel, of an annular outer member provided with a series of projections on its inner circular surface, a series of saddle pieces engaging said projections and provided with laterally projecting guide studs, a hub provided with a central cylindrical portion, a fixed flange at one end of said central portion, a removable annular disk at the other end of said central portion, an intermediate filler piece fitting said central portion, a pair of side plates secured between the aforesaid flange, annular disk and filler piece by a series of transverse bolts, said side plates being formed with a series of radial guide slots for guiding engagement with the guide studs of the saddle pieces, and a series of coiled springs arranged radially between the saddle pieces and the filler piece aforesaid, substantially as set forth.

2. The combination in a spring wheel, of an annular outer member provided with a series of projections on its inner circular surface, a series of saddle pieces engaging said projections and provided with laterally projecting guide studs, headed plugs resting against the inner sides of the saddle pieces and having spring engaging shanks, abutment plates encircling said shanks and resting against the inner sides of said saddle pieces, a hub portion, a pair of side plates attached to said hub portion and formed with a series of radial slots for guiding engagement with the guide studs of the saddle pieces, and a series of coiled springs arranged radially between the saddle pieces and the filler piece aforesaid, substantially as set forth.

Signed at Chicago, Illinois, this 25th day of August 1911.

JOSEPH KOHLER.

Witnesses:
ROBERT BURNS,
HENRY MOE.

---

Copies of this patent may be obtained for five cents each, by addressing the "Commissioner of Patents, Washington, D. C."